(12) United States Patent
Mampilly et al.

(10) Patent No.: US 11,593,104 B2
(45) Date of Patent: *Feb. 28, 2023

(54) METHODS AND SYSTEMS FOR MONITORING CONTRIBUTORS TO SOFTWARE PLATFORM DEVELOPMENT

(71) Applicant: Capital One Services, LLC, McLean, VA (US)

(72) Inventors: Joel Mampilly, Flushing, NY (US); Jonathan Barbalas, Chicago, IL (US); Michael Newell, McLean, VA (US); Ian Kirchner, Chicago, IL (US); Graham Eger, Chicago, IL (US); Sudipta Kumar Ghosh, Elk Grove Village, IL (US); Shriyans Lenkala, Carpentersville, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,233

(22) Filed: May 23, 2022

(65) Prior Publication Data
US 2022/0283804 A1 Sep. 8, 2022

Related U.S. Application Data

(63) Continuation of application No. 17/007,619, filed on Aug. 31, 2020, now Pat. No. 11,372,642.

(51) Int. Cl.
*G06F 9/44* (2018.01)
*G06F 8/77* (2018.01)
*G06F 11/34* (2006.01)
*G06F 8/65* (2018.01)
*G06F 8/71* (2018.01)

(52) U.S. Cl.
CPC ............... *G06F 8/77* (2013.01); *G06F 8/65* (2013.01); *G06F 8/71* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 2007/0006152 A1* | 1/2007 | Ahmed | G06F 21/12 717/110 |
| 2019/0095843 A1* | 3/2019 | Muthuswamy | G06F 40/30 |
| 2020/0242527 A1* | 7/2020 | Das | G06F 16/9024 |
| 2020/0285463 A1* | 9/2020 | Tornhill | G06Q 10/06311 |

* cited by examiner

Primary Examiner — Wei Y Zhen
Assistant Examiner — Lanny N Ung
(74) Attorney, Agent, or Firm — Perkins Coie LLP

(57) ABSTRACT

Methods and systems for a platform development version control system for monitoring contributors to software platform development. The methods and systems generate data analytics on contributors to software platform development using group affiliations as listed in a group directory (e.g., a corporate directory for an entity providing the software platform) as a common organizing factor. For example, by organizing the methods and systems according to the group affiliations, the methods and systems may generate data analytics on contributions of contributors within those groups, irrespective of whether or not the group members are working on the same project. The methods and systems may then provide recommendations and graphical representations based on the data analytics.

20 Claims, 6 Drawing Sheets

FIG. 1

METHODS AND SYSTEMS FOR MONITORING CONTRIBUTORS TO SOFTWARE PLATFORM DEVELOPMENT

CROSS-REFERENCE TO RELATED APPLICATION(S)

This application is a continuation of U.S. patent application Ser. No. 17/007,619, filed Aug. 31, 2020. The content of the foregoing application is incorporated herein in its entirety by reference.

FIELD OF THE INVENTION

The invention relates to managing and monitoring contributors to software platform development.

BACKGROUND

Computer programming is typically a team-based activity, in which the responsibilities for the features and source code necessary to produce a given product (e.g., a software application) are shared among team members. To facilitate this team activity, team members may submit contributions to the product to a distributed version control system. This system may include a codebase that features a full history of the product that is mirrored on every contributor's computer. Team members may submit changes to an external repository, which is reviewed before being added to the repository of the codebase. The system may enable automatic management of different branches of the product as well as the merging of different contributions. The team may also utilize one or more issue management and bug-tracking tools. The team may further outsource some issues to software-as-a-service providers. Accordingly, project management for computer programming often involves multiple team members and service providers sharing multiple versions of a single codebase for the project.

In contrast to management of a computer programming project for a product, programming for a platform is far more difficult. Computer programming to create a platform exacerbates the problems of programming for a product while also introducing new ones. For example, a platform may comprise a backbone connecting multiple products together for a given entity. Furthermore, platforms are meant to be more malleable and allow new products and features to be continuously added. As the platform provides the foundation upon which new products are continuously stacked, each contribution to the platform must ensure that no issues are created for the platform, the stacked products, and/or the relationships between different products and/or the platform itself. For example, the platform may act as a foundational service or master data repository that other software and services may use. Thus, any changes to the source code and/or data of the master data repository may affect all products as well as how the products interact with the platform and each other. Therefore, careful monitoring and review of any changes to the master data repository is needed.

SUMMARY

Methods and systems are described herein for managing and monitoring contributors to software platform development. As described above, software platform development exacerbates the problems inherent in software product development. Thus, conventional software product development tools are ill-suited for use in software platform development. One key reason is that conventional software product development tools are developed with the intention of only receiving contributions from team members unified around a common product goal. In contrast, software platform development may involve numerous different teams each working with goals towards the development of different products, numerous different teams each working with goals towards integration of different products with each other, and numerous different teams each working with goals towards maintaining the platform itself. Conventional software product development tools have no mechanism for balancing the tension created by the numerous different teams and the numerous different goals all operating without a common defining project.

The methods and systems described herein provide a mechanism for balancing these tensions. Specifically, the methods and systems generate data analytics on contributors to software platform development using group affiliations as listed in a group directory (e.g., a corporate directory for an entity providing the software platform) as a common organizing factor instead of relying on individual software projects. For example, by organizing the methods and systems according to the group affiliations, the methods and systems may generate data analytics on contributions of contributors within those groups, irrespective of whether or not the group members are working on the same project. This is particularly beneficial as analytics on contributors within those groups may be masked from conventional software product development tools when the contributors are assigned to different projects. For example, issues such as morale, poor quality and/or management, and differing programming styles and/or complexity are often linked within a group as most interactions between contributors occur within these groups. However, by managing and monitoring group members through the projects that they work on, which may be different across the group, data analytics on the contributors within the group is not available.

The methods and systems described herein is particularly relevant to the managing and monitoring of pull requests (e.g., requests for changes committed to an external repository for an individual project or the platform itself to be considered for inclusion in the platform's main repository). For example, by managing and monitoring pull requests on the group affiliation level, the system may determine whether or not a group is being well served (e.g., responses to pull requests are not unduly delayed), whether or not the pull requests from a given group are overly complex or of poor quality, and/or whether or not the group has structural problems, issues that would once again be masked from conventional software product development tools when the contributors in a common group are assigned to different projects. It is particularly important to identify these issues at the group level in order to address low morale, training needs, staffing problems and/or other fundamental operating issues.

The methods and systems also solve the problem of obtaining group affiliations of contributors. Notably, conventional software product development tools would require individual tags and/or manual updates to the development tools to capture contributor information. Such manual updates are infeasible for large and/or complex organizations in which roles may be frequently changing. The methods and systems described herein overcome this issue by tagging contributors and pull requests from the contributors using a group directory (e.g., a corporate directory for an entity providing the software platform) as opposed to relying on contributor profiles native to a development tool, which typically lag behind and are not reflective of an entity's current group affiliations.

In one aspect, systems and methods for managing and/or monitoring contributors to platform development version control system are described. For example, the system may receive a plurality of pull requests submitted from respective source code contributors, wherein each of the plurality of pull requests are for updates to source code of a software platform that are committed to an external source code repository and are awaiting inclusion in a source code repository of the source code of the software platform. The system may store respective processing metrics for each of the plurality of pull requests. The system may retrieve a group directory listing group affiliations for each of the respective source code contributors. The system may tag each of the plurality of pull requests with a group affiliation of a source code contributor that submitted each of the plurality of pull requests. The system may generate first aggregated processing metrics for a first subset of the plurality of pull requests by aggregating the respective processing metrics for each processing request in the first subset, wherein the first subset corresponds to pull requests tagged with a first group affiliation. The system may generate second aggregated processing metrics for a second subset of the plurality of pull requests by aggregating the respective processing metrics for each processing request in the second subset, wherein the second subset corresponds to pull requests tagged with a second group affiliation. The system may generate for display, on a user interface, a graphical representation comprising the first aggregated processing metrics and second aggregated processing metrics.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of or the entirety of (i.e., the entire portion) a given item (e.g., data) unless the context clearly dictates otherwise.

BRIEF DESCRIPTION OF THE DRAWINGS

FIG. 1 shows an illustrative user interface for managing and/or monitoring contributors to software platform development, in accordance with one or more embodiments.

DETAILED DESCRIPTION OF THE DRAWINGS

Figure 2:
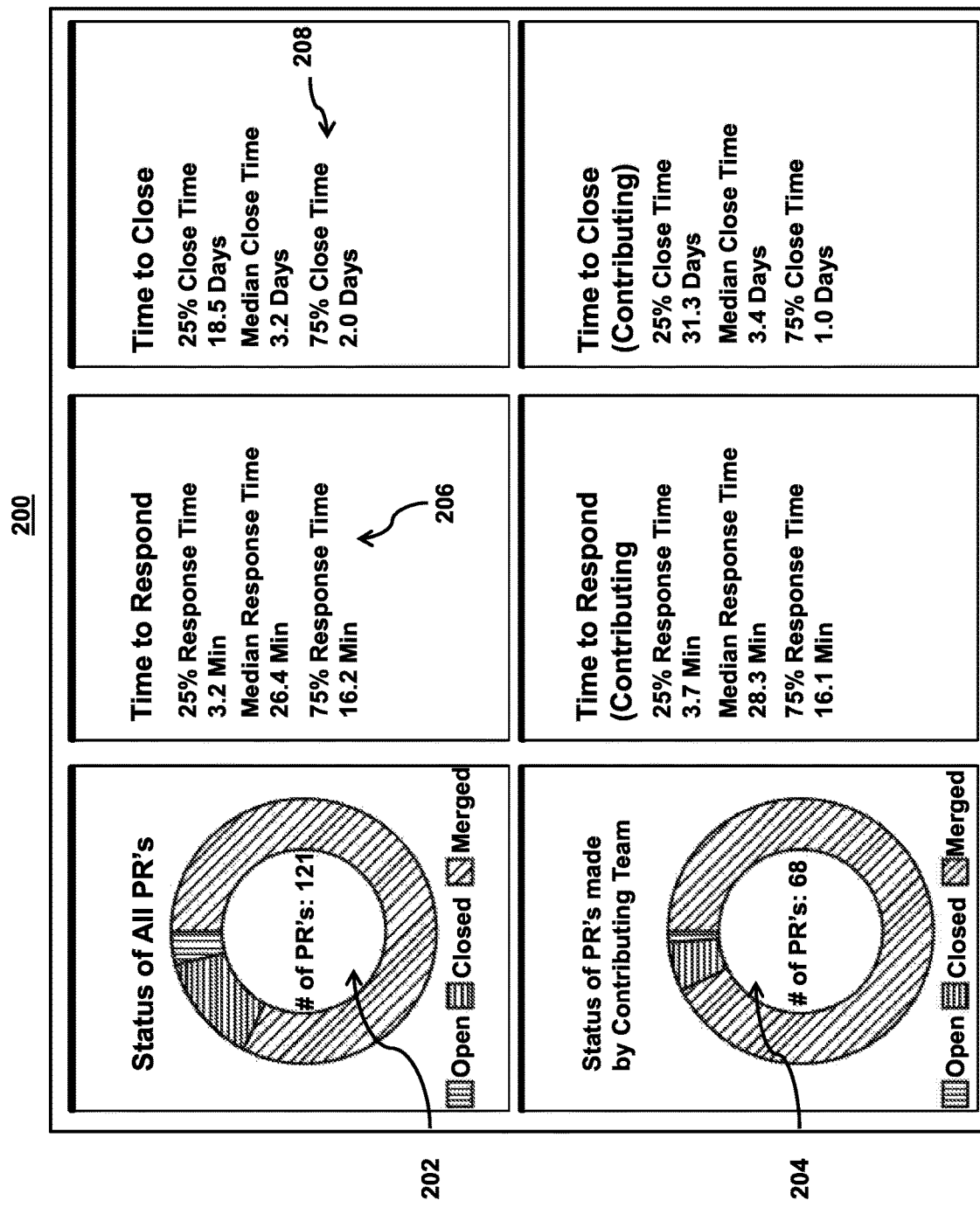
FIG. 2 shows an illustrative graphical representation of data analytics on contributors to software platform development, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
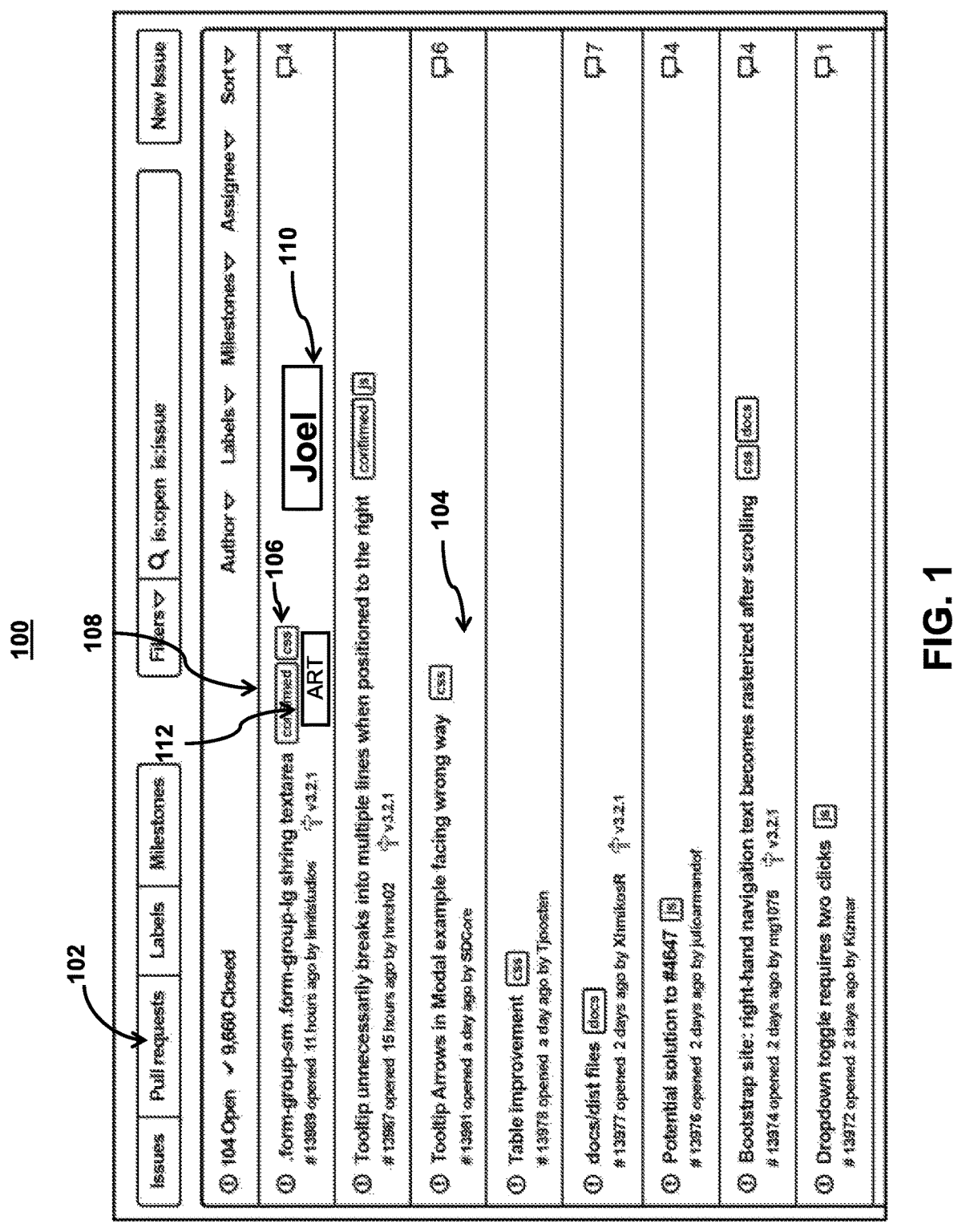

FIG. 1 shows an illustrative user interface for managing and/or monitoring contributors to software platform development, in accordance with one or more embodiments. For example, the system and methods described herein may generate for display, on a local display device (e.g., user device 422 and 424 (FIG. 4) described below), user interface 100. User interface 100 may display a plurality of pull requests submitted from respective source code contributors, wherein each of the plurality of pull requests are for updates to source code of a software platform that are committed to an external source code repository (e.g., external repository 402 (FIG. 4)) and are awaiting inclusion in a source code repository of the source code of the software platform (e.g., source code repository 404 (FIG. 4)).

User interface 100 may allow a user to access pending pull requests via icon 102. Additionally, user interface 100 may allow a review to open and/or review a pending pull request. Once a pull request is opened, a reviewer (e.g., a human reviewer and/or automation tool) may discuss and review the potential changes with contributors and add follow-up commitments before the contribution's changes are merged into the codebase. User interface 100 may also provide options for obtaining feedback and/or data analytics at a group affiliation level. By doing so, the system allows users to determine who (and what group affiliations) are building the software platform and how their contributions are treated.

For example, through the use of the data analytics provided by the system, users may determine if product contributors (e.g., contributors to a product) are treated differently than platform contributors (e.g., contributors responsible for maintaining the platform). For example, the system may show if the pull requests from some contributors (or contributors having a specific group affiliation) take longer to receive a reply to a pull request, have their source code reviewed, and/or take longer to have their contributions accepted. The system also allows contributors to be grouped by affiliations and departments, allowing corporate stakeholders and executives to make strategic staffing decisions. The system also allows users to determine what automation tools are used in the contribution process (and by what groups) as well as the complexity of contributions submitted by different groups and/or the percentage of the platform created by different groups.

For example, the software platform development system may identify how effectively the platform response is to contributions with GitHub data, such as who is building the platform (e.g., what group affiliations are contributing and how much) and how contributions from the teams are being treated. Additionally or alternatively, the system may determine whether enough people have committer (authorization/privileged) to access repositories, what automation tools (e.g., bots) should be used to handle this type of repos, what automation tools are extraneous and not adding value, what effect did implementing automation tools introduce (e.g., decrease in response/close time, etc.), are pull requests too complex to get through the system, are too many teams contributing to the repositories, and what platforms should an organizational entity take to address issues. For example, the system may provide automated answers that increase developer velocity.

The system may also provide recommendations. The recommendation may be based on a performance of a group and/or contributor as well as an automation tool. As described herein, a performance recommendation may include any quantitative or qualitative recommendation based on the performance of a contributor, group, and/or automation tool. The recommendation may be directed to the contributor themselves and/or may be directed to a project manager or other contributors (e.g., a group of contributors). In some embodiments, the system may further tailor the recommendation based on the determined audience of the recommendation. The performance recommendation may include one or more types of information. For example, the performance recommendation may include an individual (e.g., compare the group's current performance to a historical performance) or comparative analysis of the group (e.g., compare a group to other groups) or automation tools (e.g., compare one tool to another or an automation tool to a manual solution). The performance recommendation may be based on a performance level of the group (e.g., either historic or current) and/or the performance level of other groups (e.g., either historic or current). The performance level may include any quantitative or qualitative description of the group's performance.

The performance level may itself be based on one or more processing metrics. While processing metrics may include any quantitative or qualitative description of a given group's performance with regards to a specific contribution, the processing metric may be based on multiple factors. In some embodiments, the system may determine processing metrics based on specific data that is generated in addition to a contributor's normal contribution. This data may represent a quantitative assessment of the performance of the contributor. Furthermore, to limit bias and subjective input, the data may be normalized not to a specific product (e.g., how others performed on their product), but based on an assessment of the type and time to provide resolutions to pull requests and/or the overall contribution to the platform.

For example, FIG. 1 displays user interface 100. User interface 100 may represent an exemplary user interface for a platform development version control system. As such, user interface 100 may include a plurality of tasks (e.g., task 104) that need to be completed for a project and/or platform. As described herein, a project may include any individual or collaborative enterprise that is carefully planned and designed to achieve a particular aim. In some embodiments, the project may include a source code programming or other project related to the development of software or a computer-based feature. The project may also include multiple components or more of which may be based on programming source code, non-source code programming, and/or other development goals. Each project may include one or more contributors that submit contributions to the goal of the project. For example, the project may include the development of a computer feature and/or the contributors to the project may be linked together through a common entity (e.g., a company) or organized in a distributed fashion (e.g., a crowd-sourced project). The project may be distinguished from other projects based on a stated goal, time period, and/or the constituency of contributors. As described herein, a platform may include a computing platform or digital platform environment in which a piece of software is executed. It may be the hardware, operating system (OS), a web browser and associated application programming interfaces, or other underlying software, as long as the program code is executed with it.

In some embodiments, one or more contributions may correspond to one or more projects/platforms and/or may further correspond to one or more platform development tools. For example, the platform development version control system may receive contributions from one or more platform development tools. Each platform development tool may provide one or more good or service that furthers a goal of the platform development tool. For example, a platform development tool may include a software-as-a-service provider that provides technical management support, such as IT service management, to the IT operations of large corporations, including providing help desk functionality. In another example, the platform development tool may include a site that provides social networking-like functions such as feeds, followers, wilds, and a social network graph to display how developers work on their versions ("forks") of a repository and what fork (and branch within that fork) is newest. In another example, the platform development tool may include a service for hosting code snippets for small and/or large projects. In another example, the platform development tool may include a service used for issue tracking and project management.

As presented in FIG. 1, the plurality of tasks may be filtered based on a user selection requesting the display of completed tasks with identified issues (e.g., identified through manual peer review, in accordance with project procedures, and/or automatically through an issue-spotting or bug-tracking program such as automation tools). For example, a user (e.g., a project manager and/or contributor) may filter the tasks by selecting an icon associated with tasks having issues.

User interface may further include an icon featuring information about a given issue (e.g., icons 106 and 108). For example, icons 106 and 108 may indicate the type of issue, how the issue was detected (e.g., based on manual or automatic review), and/or whether or not the issue is confirmed to exist. User interface 100 may also include an icon indicating a second contributor that is assigned to resolve the issue (e.g., icon 110). As described below in relation to FIG. 5, in some embodiments, the system may assign a second contributor to resolve the issue based on the respective performance levels of the contributors.

User interface 100 and the information displayed therein may be generated using cloud-based memory configured to store current source code for a first task and tag for identified issues in the current source code and group affiliations for the contributor (e.g., icon 112). For example, by storing current source code (e.g., a codebase) for the project and receiving contributions from multiple contributors, the system may manage the creation of the source code for the platform while detecting and resolving issues in individual contributions related to projects and/or the platform. Furthermore, by generating tags (e.g., metadata describing issues and information related to the issue such as the contributor, type of task, how the issue was detected, etc.), the system may assign and resolve the identified issue through a means that allows for the creation of the processing metrics on a group affiliation level.

The system may determine the group affiliation of different contributors by retrieving a group directory listing group affiliations for each of the respective source code contributors, wherein the group directory comprises a corporate directory for an entity providing the software platform. In some embodiments, the group directory may indicate contributor names and organizational roles.

In some embodiments, the system may retrieve the group directory from an internal database, which may be implemented by associating the file name with an index in a table of contents or an anode in a Unix-like file system. Directory structures may be flat (i.e., linear), or allow hierarchies where directories may contain subdirectories (e.g., indicating multiple affiliations). In some embodiments, the system may scrape (e.g., via web scraping) directory information from third-party sources (e.g., social-networking, job listings, or government submissions). Additionally or alternatively, the system may use Application Programming Interface ("API") calls to retrieve company information. For example, the system may issue a GET call to the company directory API to retrieve the group affiliations and hierarchy of a contributor.

For example, the cloud-based control circuitry is configured to receive a first contribution of source code for a first project to a software development version control system, wherein the first contribution is received from a first contributor and tags the first contribution with a first identified issue. The system may then assign the first identified issue to a second contributor and receive a second contribution of source code to resolve the first identified issue.

Additionally, the system may determine a first resolution type of the second contribution and determine a first length of programming time corresponding to the second contribution. The information which relates to the way in which the issue was resolved and the time that was required to resolve the issue is then used to generate a first processing metric for the second contribution based on the first resolution type and the first length of programming time.

As used herein, a resolution type includes a quantitative or qualitative metric used to distinguish one resolution type from another resolution type. For example, resolution type may be distinguished based on the underlying problem such as erroneous code (e.g., unclosed loops, typographical errors, etc.), poor design (e.g., redundant functions, unnecessary links, etc.), or incorrect programming language and/or use of incorrect programming language functions. The resolution type may alternatively or additionally be based on the complexity of the resolution. For example, the correction of a typographical error may have low complexity, whereas the re-writing of an entire sequence of the contribution may have a high complexity. The resolution type may alternatively or additionally be based on the skills of the contributor required to resolve the issue. For example, the correction of a typographical error may require only proofreading skills, whereas the re-writing of an entire sequence of the contribution may require problem-solving and/or knowledge of the programming language.

The system may also track the amount of time required by the second contributor to correct the problem. In some embodiments, the system may track the entire length of time from assignment to resolution of the issue. Alternatively or additionally, the system may determine a length of programming time corresponding to a second contribution. For example, the length of programming time may correspond to the amount of time to generate new code. In some embodiments, the system distinguishes length of time to generate the new code from the length of time (if any) required by the second contributor to identify the issue. For example, by distinguishing the total time in this way, the system may prevent the processing metric from being biased by stylistic choices and/or other factors. The system may likewise determine a time the second contributor actually spent to resolve the issue (e.g., based on determining that the second contributor was active at his/her user device) in order to prevent the system from considering time when the second contributor was away from his/her user device (e.g., on a break).

The system may then generate and assign the first processing metric. In some embodiments, the system may track multiple contributors across multiple projects and/or time periods and with references to the current, determined, and/or historical skills and performance level of numerous contributors. In some embodiments, the system may generate machine learning models to determine processing metrics, performance levels, and/or performance recommendations.

In some embodiments, user interface 100 may also provide recommendations for staffing for future projects and/or tasks for the platform based on a group affiliation. For example, the system may monitor a software development score of a contributor. As the contributor contributes to more projects and/or tasks, the system may update the platform development score of the contributor. For example, the system may receive an updated first platform development score for the first contributor, store the updated first platform development score, and generate for display a graphical representation of a relationship of the first platform development score to the updated first platform development score. The system may further extrapolate a future first platform development score for the first group on a future project based on the first platform development score and the updated first platform development score and generate for display a recommendation for staffing the future project based on the future first platform development score. For example, the system may recommend a given contributor for a given task and/or project based on a group affiliation of the contributor in order to provide the most efficient and effective staffing.

FIG. 2 shows an illustrative graphical representation of data analytics on contributors to software platform development, in accordance with one or more embodiments. For example, the system may generate a diagram showing the relation between variable quantities, typically of two variables, each measured along one of a pair of axes at right angles. In some embodiments, the variable may be related to the processing metrics (or aggregated processing metrics) for one or more groups.

For example, FIG. 2 shows user interface 200, which includes graphical representation 202 and graphical representation 204. Graphical representation 202 shows a status of all pull requests, while graphical representation 204 shows a status from a particular team (e.g., a team that maintains the platform as opposed to developing products for the platform). Additionally, user interface 200 includes data analytics related to a time of response to pull requests (e.g., processing metrics 206) and data analytics related to a time of closing pull requests (e.g., processing metrics 208).

Figure 3:
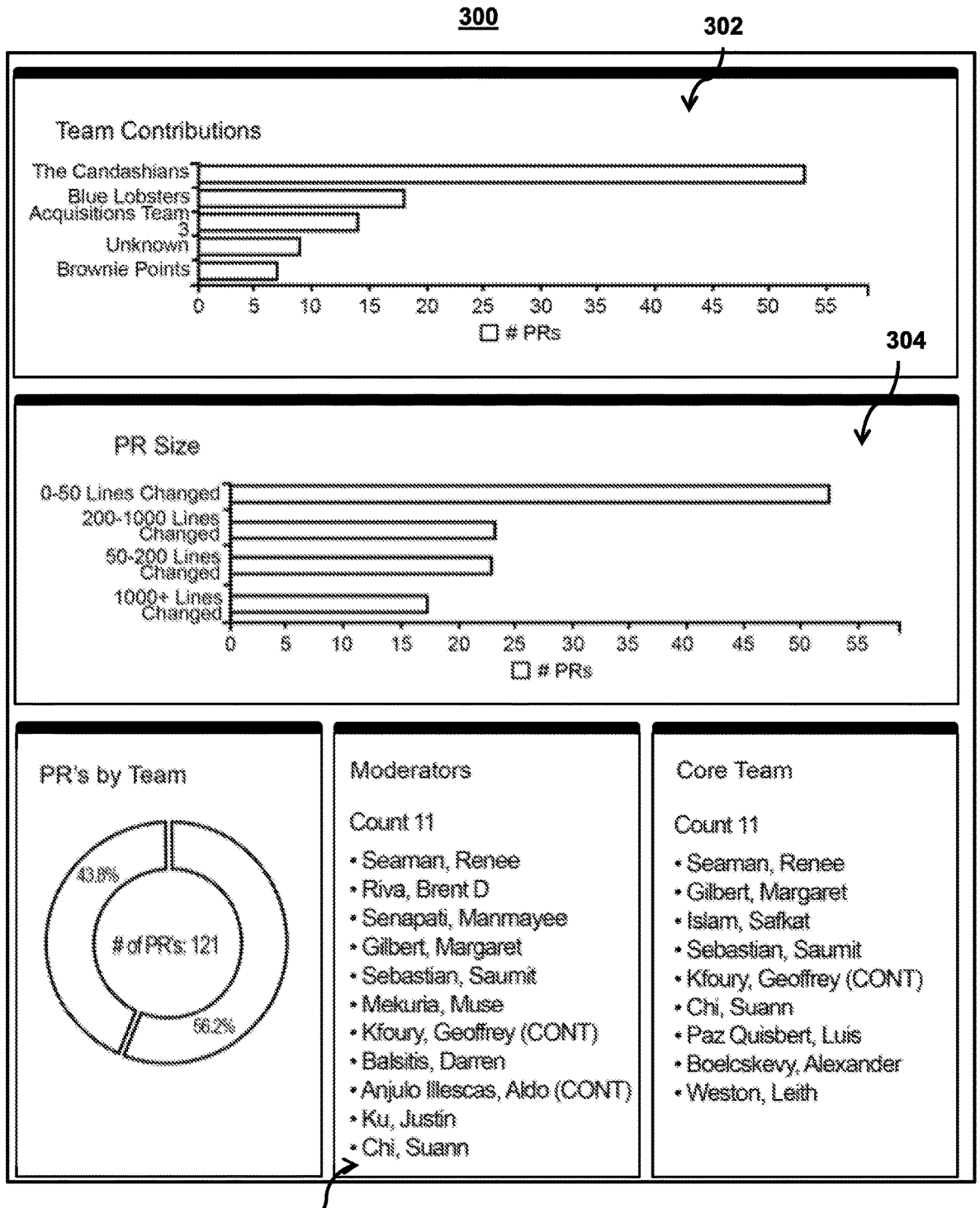
FIG. 3 shows an illustrative graphical representation of data analytics on contributors to software platform development, in accordance with one or more embodiments.

FIG. 3 shows an illustrative graphical representation of data analytics on contributors to software platform development, in accordance with one or more embodiments. For example, user interface 300 may appear in a user interface for the system (e.g., on a user device 422 (FIG. 4)). For example, FIG. 2 shows user interface 200, which includes graphical representation 202 and graphical representation 204. Graphical representation 202 shows a status of all pull requests, while graphical representation 204 shows a status from a particular team (e.g., a team that maintains the platform as opposed to developing products for the platform). Additionally, user interface 200 includes data analytics related to a time of response to pull requests (e.g., processing metrics 206) and data analytics related to a time of closing pull requests (e.g., processing metrics 208).

For example, FIG. 3 shows user interface 300, which includes graphical representation 302, graphical representation 304, and diagram 306. Graphical representation 302 displays processing metrics according to team affiliation allowing a user to review a rank of a given group, while graphical representation 304 shows a complexity (e.g., number of lines changed) in pull requests for a given group. User interface 300 also includes group members in different groups of targeted groups in diagram 306.

Figure 4:
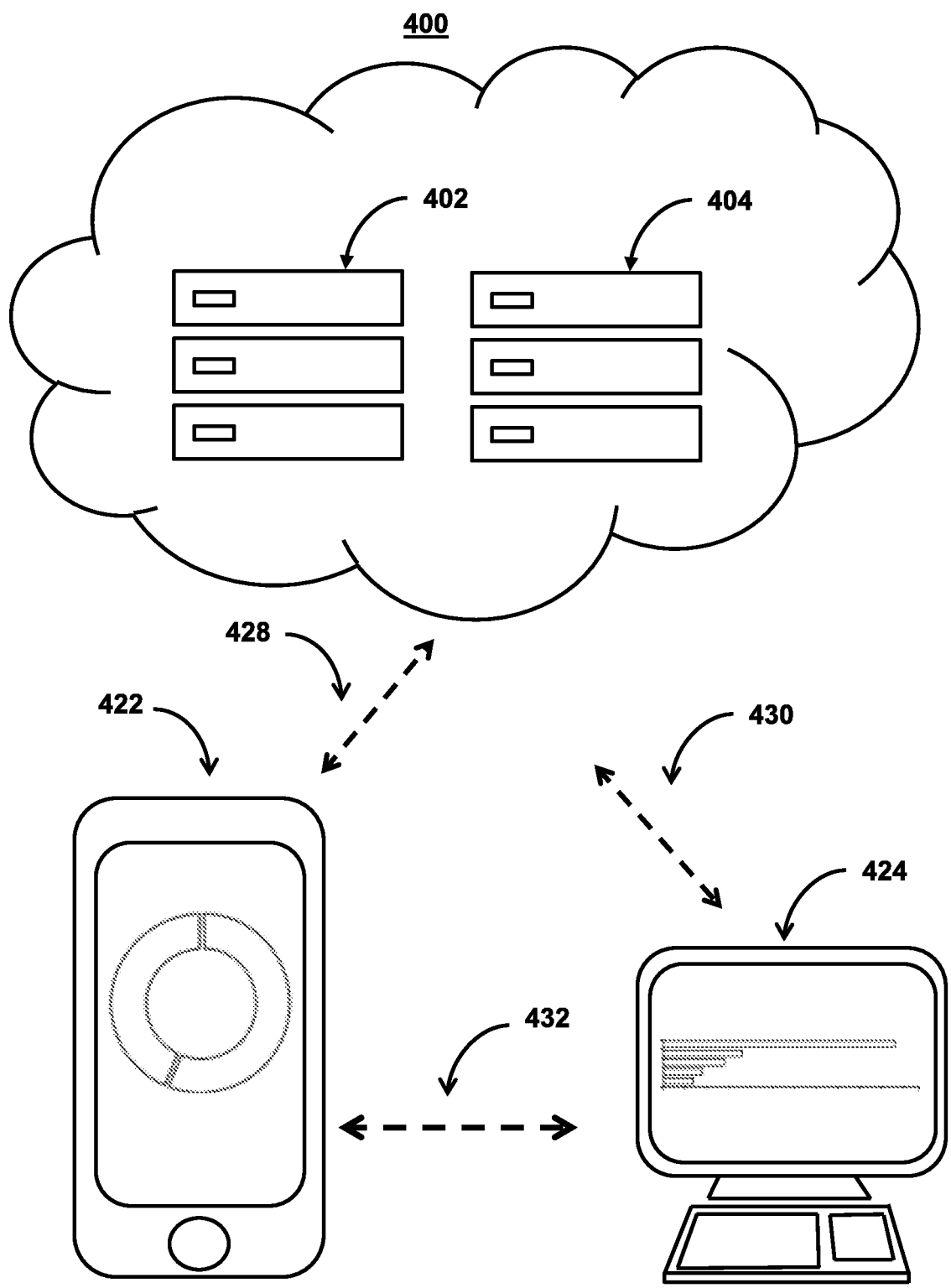
FIG. 4 shows an illustrative system for managing and/or monitoring contributors to software platform development, in accordance with one or more embodiments.

FIG. 4 shows an illustrative system for managing and/or monitoring contributors to software platform development, in accordance with one or more embodiments. FIG. 4 shows an illustrative system for a software development version control system, in accordance with one or more embodiments. As shown in FIG. 4, system 400 may include user device 422, user device 424, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 422 and user device 424 may include a desktop computer, a server, or other client device. Users may, for instance, utilize one or more of the user devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of user device 422, those operations may, in some embodiments, be performed by components of user device 424. System 400 also includes external repository 402 and source code repository 404, which may be implemented on user device 422 and user device 424, or accessible by communication paths 428 and 430, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

For example, in some embodiments, system 400 may represent a cloud-based system that includes multiple cloud-based components for providing a platform development version control system. The cloud-based system may include components such as memory, control circuitry, and/or I/O circuitry. The cloud-based memory may be configured to store source code contributions, respective processing metrics for each of a plurality of pull requests, and a centralized source code repository. The cloud-based control circuitry may be configured to receive a first user input from the first contributor, retrieve a user profile for the first contributor in response to receiving the first user input, wherein the user profile includes a first authorization, and determine a subset of the plurality of other software development scores to which the first contributor has access to based on the first authorization. The cloud-based I/O circuitry may be configured to generate for display, on a local display device, a graphical representation of a qualitative comparison of the first software development score and the subset of the plurality of other software development scores.

In some embodiments, the cloud-based memory may be configured to store current source code for a platform and tags for identified issues in the source code. The cloud-based control circuitry may be configured to receive a first contribution of source code for a first project to a software development version control system, wherein the first contribution is received from a first contributor, tag the first contribution with a first identified issue, assign the first identified issue to a second contributor, receive a second contribution of source code to resolve the first identified issue, determine a first resolution type of the second contribution, determine a first length of programming time corresponding to the second contribution, generate a first processing metric for the second contribution based on the first resolution type and the first length of programming time, wherein the first processing metric is generated using a machine learning model that compares the first length of programming time to a determined average length of programming time for the first resolution type, and assign the first processing metric to the first contributor. The cloud-based I/O circuitry may be configured to generate for display, on a user interface for the platform development version control system, a graphical representation comprising the first aggregated processing metrics and second.

FIG. 4 also includes communication paths 428, 430, and 432. Communication paths 428, 430, and 432 may include the Internet, a mobile phone network, a mobile voice or data network (e.g., a 4G or LTE network), a cable network, a public switched telephone network, or other types of communications networks or combinations of communications networks. Communication paths 428, 430, and 432 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Figure 5:
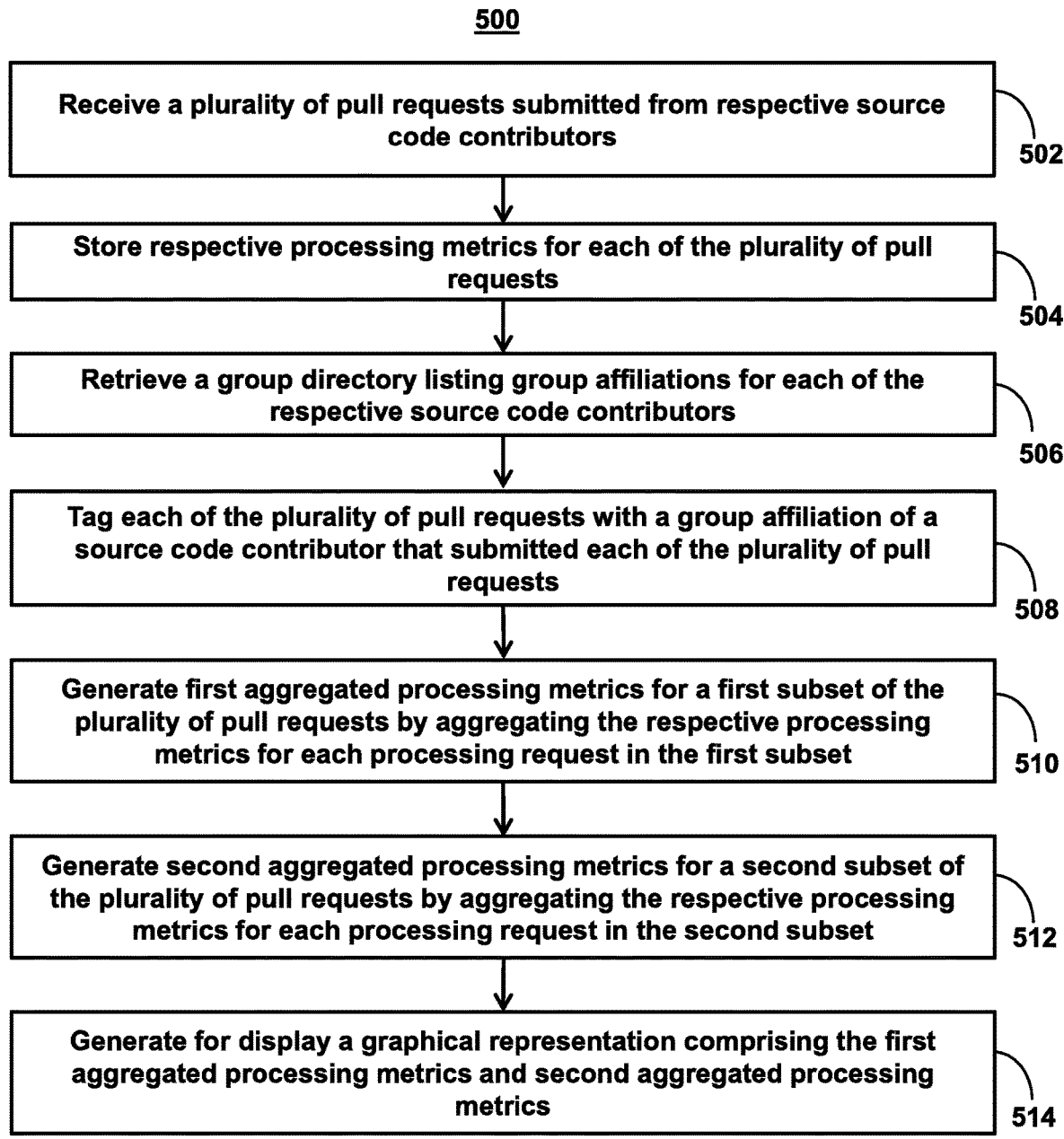
FIG. 5 shows a flow chart of the steps involved in managing and/or monitoring contributors to software platform development, in accordance with one or more embodiments.

FIG. 5 shows a flowchart of the steps involved in managing and/or monitoring contributors to software platform development, in accordance with one or more embodiments. For example, process 500 may represent the steps taken by one or more devices as shown in FIGS. 1-2 when monitoring contributors to software platform development.

At step 502, process 500 receives (e.g., via a platform development version control system) a plurality of pull requests submitted from respective source code contributors. For example, the system may receive, at a platform development version control system, a plurality of pull requests submitted from respective source code contributors, wherein each of the plurality of pull requests are for updates to source code of a software platform that are committed to an external source code repository and are awaiting inclusion in a source code repository of the source code of the software platform.

For example, the system may have an external source code repository (e.g., an external source code repository 402 (FIG. 4)) for storing contributions that need to be reviewed prior to incorporation into the source code of the software platform stored in a source code repository (e.g., source code repository 404 (FIG. 4)) of the source code of the software platform.

At step 504, process 500 stores (e.g., via a platform development version control system) respective processing metrics for each of the plurality of pull requests. For example, the system may store, in the platform development version control system, respective processing metrics for each of the plurality of pull requests.

At step 506, process 500 retrieves (e.g., via a platform development version control system) a group directory listing group affiliations for each of the respective source code contributors. For example, the system may retrieve, by the platform development version control system, a group directory that lists group affiliations for each of the respective source code contributors. For example, the group directory may comprise a corporate directory for an entity providing the software platform. For example, the group directory may indicate contributor names and organizational roles.

At step 508, process 500 tags (e.g., via a platform development version control system) each of the plurality of pull requests with a group affiliation of a source code contributor that submitted each of the plurality of pull requests. For example, the system may tag each of the plurality of pull requests with a group affiliation of a source code contributor that submitted each of the plurality of pull requests. The system may store these tags and periodically query a source of the group directory for changes.

At step 510, process 500 generates (e.g., via a platform development version control system) first aggregated processing metrics for a first subset of the plurality of pull requests by aggregating the respective processing metrics for each processing request in the first subset. For example, the system may generate, by the platform development version control system, first aggregated processing metrics for a first subset of the plurality of pull requests by aggregating the respective processing metrics for each processing request in the first subset, wherein the first subset corresponds to pull requests tagged with a first group affiliation.

In some embodiments, the respective processing metrics for each of the plurality of pull requests may comprise a number of lines of source code changes in a respective pull request, and the first aggregated processing metrics may indicate an average number of lines of source code changes for each processing request in the first subset. In some embodiments, the respective processing metrics for each of the plurality of pull requests may comprise a length of processing time for a respective pull request, and the first aggregated processing metrics may indicate an average length of processing time for each processing request in the first subset. In some embodiments, the respective processing metrics for each of the plurality of pull requests may comprise an indication of whether or not a respective pull request was accepted, and the first aggregated processing metrics may indicate an average number of pull requests that were accepted in the first subset. In some embodiments, the respective processing metrics for each of the plurality of pull requests may comprise an identification of an automation tool that responded to a respective pull request, and the first aggregated processing metrics may indicate a frequency that the automation tool responded to processing requests in the first subset.

At step 512, process 500 generates (e.g., via a platform development version control system) second aggregated processing metrics for a second subset of the plurality of pull requests by aggregating the respective processing metrics for each processing request in the second subset. For example, the system may generate, by the platform development version control system, second aggregated processing metrics for a second subset of the plurality of pull requests by aggregating the respective processing metrics for each processing request in the second subset, wherein the second subset corresponds to pull requests tagged with a second group affiliation. It should be noted that the system may use different methodologies to aggregate processing metrics such as determining a mean, mode, and/or median.

At step 514, process 500 generates (e.g., via a platform development version control system) for display a graphical representation comprising the first aggregated processing metrics and second aggregated processing metrics. For example, the system may generate for display, on a user interface for the platform development version control system, a graphical representation comprising the first aggregated processing metrics and second aggregated processing metrics.

In some embodiments, the system may also retrieve (e.g., by the platform development version control system) authorization credentials for each of the respective source code contributors, wherein the authorization credentials indicate whether or not a source code contributor is authorized to update the source code of the software platform. The system may then tag each of the plurality of pull requests with an authorization credential of the source code contributor that submitted each of the plurality of pull requests. The system may use these tags to filter the pull requests and/or generate graphical representations.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 5.

Figure 6:
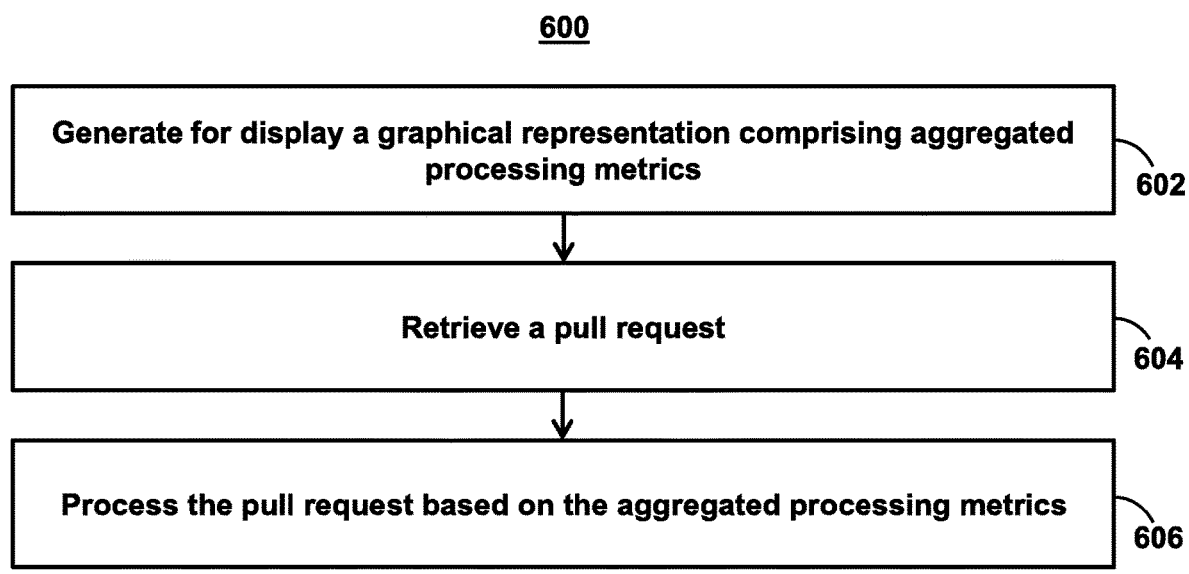
FIG. 6 shows a flow chart of the steps involved in processing pull requests based on aggregated processing metrics, in accordance with one or more embodiments.

FIG. 6 shows a flowchart of the steps involved in processing pull requests based on aggregated processing metrics, in accordance with one or more embodiments. For example, process 600 may represent the steps taken by one or more devices as shown in FIGS. 1-2 when assigning issues to contributors.

At step 602, process 600 generates (e.g., via a platform development version control system) for display a graphical representation comprising aggregated processing metrics. For example, the system may, as described in step 514 (FIG. 5), generate for display, on a user interface (e.g., user interface 100 (FIG. 1)) for the platform development version control system, a graphical representation comprising the first aggregated processing metrics and second aggregated processing metrics.

At step 604, process 600 retrieves (e.g., via a platform development version control system) a pull request. For example, the system may retrieve a pull request from the first subset of the plurality of pull requests. For example, the system may retrieve a pull request from user interface 100 (FIG. 1)).

At step 606, process 600 processes (e.g., via a platform development version control system) the pull request based on the aggregated processing metrics. For example, the system may assign the pull request to a reviewer (e.g., a person or automation tools that responds to the pull request) based on the first aggregated processing metrics. Alternatively or additionally, the system may prioritize the pull request based on the first aggregated processing metric. For example, if the first aggregated processing metrics indicate the pull requests from this group have a poor average response time, the system may prioritize the response of this pull request to improve the average response time. In another example, if the first aggregated processing metrics indicate the pull requests from this group are not complex, the system may prioritize the response of this pull request as it may be quickly handled.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for managing and/or monitoring contributors to a platform development version control system, comprising: receiving, at a platform development version control system, a plurality of pull requests submitted from respective source code contributors, wherein each of the plurality of pull requests are for updates to source code of a software platform that are committed to an external source code repository and are awaiting inclusion in a source code repository of the source code of the software platform; storing, in the platform development version control system, respective processing metrics for each of the plurality of pull requests; retrieving, by the platform development version control system, a group directory listing group affiliations for each of the respective source code contributors; tagging each of the plurality of pull requests with a group affiliation of a source code contributor that submitted each of the plurality of pull requests; generating, by the platform development version control system, first aggregated processing metrics for a first subset of the plurality of pull requests by aggregating the respective processing metrics for each processing request in the first subset, wherein the first subset corresponds to pull requests tagged with a first group affiliation; generating, by the platform development version control system, second aggregated processing metrics for a second subset of the plurality of pull requests by aggregating the respective processing metrics for each processing request in the second subset, wherein the second subset corresponds to pull requests tagged with a second group affiliation; and generating for display, on a user interface for the platform development version control system, a graphical representation comprising the first aggregated processing metrics and second aggregated processing metrics.

2. The method of embodiment 2, wherein the respective processing metrics for each of the plurality of pull requests comprise a number of lines of source code changes in a respective pull request, and wherein the first aggregated processing metrics indicate an average number of lines of source code changes for each processing request in the first subset.

3. The method of any one of embodiments 1-2, wherein the respective processing metrics for each of the plurality of pull requests comprise a length of processing time for a respective pull request, and wherein the first aggregated processing metrics indicate an average length of processing time for each processing request in the first subset.

4. The method of any one of embodiments 1-3, wherein the respective processing metrics for each of the plurality of pull requests comprise an indication of whether or not a respective pull request was accepted, and wherein the first aggregated processing metrics indicate an average number of pull requests that were accepted in the first subset.

5. The method of any one of embodiments 1-4, wherein the respective processing metrics for each of the plurality of pull requests comprise an identification of an automation tool that responded to a respective pull request, and wherein the first aggregated processing metrics indicate a frequency that the automation tool responded to processing requests in the first subset.

6. The method of any one of embodiments 1-5, further comprising: retrieving, by the platform development version control system, authorization credentials for each of the respective source code contributors, wherein the authorization credentials indicate whether or not a source code contributor is authorized to update the source code of the software platform; and tagging each of the plurality of pull requests with an authorization credential of the source code contributor that submitted each of the plurality of pull requests;

7. The method of any one of embodiments 1-6, wherein the group directory comprises a corporate directory for an entity providing the software platform.

8. The method of any one of embodiments 1-7, wherein the group directory indicates contributor names and organizational roles.

9. The method of any one of embodiments 1-8, further comprising: retrieving a pull request from the first subset of the plurality of pull requests; and assigning the pull request to a reviewer based on the first aggregated processing metrics.

10. The method of any one of embodiments 1-9, further comprising: retrieving a pull request from the first subset of the plurality of pull requests; and prioritizing the pull request based on the first aggregated processing metrics.

11. A non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A platform development version control system for monitoring contributors to software platform development, comprising:
   cloud-based memory configured to store respective processing metrics for each of a plurality of pull requests; and
   cloud-based control circuitry configured to:
      receive the plurality of pull requests submitted from respective source code contributors, wherein each of the plurality of pull requests are for updates to source code of a software platform that are committed to an external source code repository and are awaiting inclusion in a source code repository of the software platform;
      tag each of the plurality of pull requests with a group affiliation of a source code contributor that submitted each of the plurality of pull requests;
      generate first aggregated processing metrics for a first subset of the plurality of pull requests by aggregating the respective processing metrics for each processing request in the first subset, wherein the first subset corresponds to pull requests tagged with a first group affiliation;
      generate second aggregated processing metrics for a second subset of the plurality of pull requests by aggregating the respective processing metrics for each processing request in the second subset, wherein the second subset corresponds to pull requests tagged with a second group affiliation;
      determine that a first pull request is associated with the first aggregated processing metrics; and
      based on determining that the first pull request is associated with the first aggregated processing metrics, prioritize the first pull request over other pull requests, wherein prioritizing the first pull request comprises committing code changes associated with the first pull request to a codebase before committing the code changes of the other pull requests to the codebase.

2. A method for monitoring contributors to platform development version control systems, comprising:
   receiving, at a platform development version control system, a plurality of pull requests submitted from respective source code contributors, wherein each of the plurality of pull requests are for updates to source code of a software platform;
   storing, in the platform development version control system, respective processing metrics for each of the plurality of pull requests;
   tagging each of the plurality of pull requests with a group affiliation of a source code contributor that submitted each of the plurality of pull requests;
   aggregating the respective processing metrics for each processing request tagged with a first group affiliation into first aggregated processing metrics and the respective processing metrics for each processing request tagged with a second group affiliation into second aggregated processing metrics;
   determining that a first pull request is associated with the first aggregated processing metrics; and
   based on determining that the first pull request is associated with the first aggregated processing metrics, prioritizing the first pull request over other pull requests, wherein prioritizing the first pull request comprises committing code changes associated with the first pull request to a codebase before committing the code changes of the other pull requests to the codebase.

3. The method of claim 2, wherein the respective processing metrics for each of the plurality of pull requests comprise a number of lines of source code changes in a respective pull request, and wherein the first aggregated processing metrics indicate an average number of lines of source code changes for each processing request associated with the first group affiliation.

4. The method of claim 2, wherein the respective processing metrics for each of the plurality of pull requests comprise a length of processing time for a respective pull request, and wherein the first aggregated processing metrics indicate an average length of processing time for each processing request associated with the first group affiliation.

5. The method of claim 2, wherein the respective processing metrics for each of the plurality of pull requests comprise an indication of whether or not a respective pull request was accepted, and wherein the first aggregated processing metrics indicate an average number of pull requests associated with the first group affiliation that were accepted.

6. The method of claim 2, wherein the respective processing metrics for each of the plurality of pull requests comprise an identification of an automation tool that responded to a respective pull request, and wherein the first aggregated processing metrics indicate a frequency that the automation tool responded to processing requests associated with the first group affiliation.

7. The method of claim 2, further comprising:
   retrieving, by the platform development version control system, authorization credentials for each of the respective source code contributors, wherein the authorization credentials indicate whether or not the source code contributor is authorized to update the source code of the software platform; and tagging each of the plurality of pull requests with an authorization credential of the source code contributor that submitted each of the plurality of pull requests.

8. The method of claim 2, further comprising retrieving, by the platform development version control system, a group directory that lists group affiliations for each respective source code contributor, wherein the group directory comprises a corporate directory for an entity providing the software platform.

9. The method of claim 2, retrieving, by the platform development version control system, a group directory that lists group affiliations for each respective source code contributor, wherein the group directory indicates contributor names and organizational roles.

10. The method of claim 2, further comprising:
retrieving a pull request associated with the first group affiliation; and
assigning the pull request to a reviewer based on the first aggregated processing metrics.

11. The method of claim 2, further comprising:
retrieving a pull request associated with the first group affiliation; and
prioritizing the pull request based on the first aggregated processing metrics.

12. A non-transitory, computer-readable medium comprising instructions that, when executed by one or more processors, cause operations comprising:
receiving, at a platform development version control system, a plurality of pull requests submitted from respective source code contributors, wherein each of the plurality of pull requests are for updates to source code of a software platform;
storing, in the platform development version control system, respective processing metrics for each of the plurality of pull requests;
tagging each of the plurality of pull requests with a group affiliation of a source code contributor that submitted each of the plurality of pull requests;
aggregating the respective processing metrics for each processing request tagged with a first group affiliation into first aggregated processing metrics and the respective processing metrics for each processing request tagged with a second group affiliation into second aggregated processing metrics;
determining that a first pull request is associated with the first aggregated processing metrics; and
based on determining that the first pull request is associated with the first aggregated processing metrics, prioritizing the first pull request over other pull requests, wherein prioritizing the first pull request comprises committing code changes associated with the first pull request to a codebase before committing the code changes of the other pull requests to the codebase.

13. The non-transitory, computer-readable medium of claim 12, wherein the respective processing metrics for each of the plurality of pull requests comprise a number of lines of source code changes in a respective pull request, and wherein the first aggregated processing metrics indicate an average number of lines of source code changes for each processing request associated with the first group affiliation.

14. The non-transitory, computer-readable medium of claim 12, wherein the respective processing metrics for each of the plurality of pull requests comprise a length of processing time for a respective pull request, and wherein the first aggregated processing metrics indicate an average length of processing time for each processing request associated with the first group affiliation.

15. The non-transitory, computer-readable medium of claim 12, wherein the respective processing metrics for each of the plurality of pull requests comprise an indication of whether or not a respective pull request was accepted, and wherein the first aggregated processing metrics indicate an average number of pull requests associated with the first group affiliation that were accepted.

16. The non-transitory, computer-readable medium of claim 12, wherein the respective processing metrics for each of the plurality of pull requests comprise an identification of an automation tool that responded to a respective pull request, and wherein the first aggregated processing metrics indicate a frequency that the automation tool responded to processing requests associated with the first group affiliation.

17. The non-transitory, computer-readable medium of claim 12, wherein the instructions further cause the one or more processors to perform operations comprising:
retrieving, by the platform development version control system, authorization credentials for each of the respective source code contributors, wherein the authorization credentials indicate whether or not the source code contributor is authorized to update the source code of the software platform; and
tagging each of the plurality of pull requests with an authorization credential of the source code contributor that submitted each of the plurality of pull requests.

18. The non-transitory, computer-readable medium of claim 12, wherein the instructions further cause the one or more processors to retrieve a group directory that lists group affiliations for each respective source code contributor, wherein the group directory comprises a corporate directory for an entity providing the software platform.

19. The non-transitory, computer-readable medium of claim 12, wherein the instructions further cause the one or more processors to perform operations comprising:
retrieving a pull request associated with the first group affiliation; and
assigning the pull request to a reviewer based on the first aggregated processing metrics.

20. The non-transitory, computer-readable medium of claim 12, wherein the instructions further cause the one or more processors to perform operations comprising:
retrieving a pull request associated with the first group affiliation; and
prioritizing the pull request based on the first aggregated processing metrics.

* * * * *